United States Patent
Orji et al.

(10) Patent No.: US 10,996,356 B2
(45) Date of Patent: May 4, 2021

(54) SWEEP SIGNAL FOR COMBINATION OF A MARINE NON-IMPULSIVE SOURCE OUTPUT WITH A MARINE IMPULSIVE SOURCE OUTPUT

(71) Applicant: PGS Geophysical AS, Oslo (NO)

(72) Inventors: Okwudili Orji, Oslo (NO); Walter F. Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 526 days.

(21) Appl. No.: 15/877,442

(22) Filed: Jan. 23, 2018

(65) Prior Publication Data

US 2018/0239039 A1    Aug. 23, 2018

Related U.S. Application Data

(60) Provisional application No. 62/462,385, filed on Feb. 23, 2017.

(51) Int. Cl.
  *G01V 1/38* (2006.01)
  *G01V 1/00* (2006.01)
  *G01V 1/04* (2006.01)

(52) U.S. Cl.
  CPC ............... *G01V 1/005* (2013.01); *G01V 1/04* (2013.01); *G01V 1/3808* (2013.01); *G01V 2210/127* (2013.01)

(58) Field of Classification Search
  CPC ........ G01V 1/005; G01V 1/04; G01V 1/3808; G01V 2210/127
  See application file for complete search history.

(56) References Cited

U.S. PATENT DOCUMENTS

| | | | | |
|---|---|---|---|---|
| 4,607,353 A | * | 8/1986 | Muir | G01V 1/005 |
| | | | | 367/100 |
| 4,715,021 A | * | 12/1987 | Dittert | G01V 1/366 |
| | | | | 367/41 |
| 7,881,160 B2 | | 2/2011 | Rouquette | |
| 8,559,275 B2 | | 10/2013 | Sallas | |
| 8,619,497 B1 | | 12/2013 | Sallas et al. | |

(Continued)

FOREIGN PATENT DOCUMENTS

| EP | 0113220 | 7/1984 |
|---|---|---|
| EP | 2341325 | 7/2011 |

(Continued)

OTHER PUBLICATIONS

GB Search Report for related GB Application No. 1802921.5, dated Aug. 23, 2018 (3 pgs).

*Primary Examiner* — Ian J Lobo

(57) ABSTRACT

Parameters of a sweep signal that controls operation of a marine non-impulsive source can be set. Setting the parameters can include selecting a stop frequency of the sweep signal, defining a taper of the sweep signal, and adjusting an initial phase of the sweep signal. The parameters can be set such that a magnitude of an amplitude spectrum of a combined output of a marine impulsive source and the marine non-impulsive source is greater than or equal to a magnitude of an amplitude spectrum of a marine impulsive source output at frequencies below the stop frequency. A controller of the marine non-impulsive source can be programmed with the sweep signal having the parameters set to control the marine non-impulsive source.

20 Claims, 9 Drawing Sheets

(56) References Cited

U.S. PATENT DOCUMENTS

| | | | |
|---|---|---|---|
| 2008/0137476 A1* | 6/2008 | Eick | G01V 1/005 |
| | | | 367/38 |
| 2011/0149683 A1* | 6/2011 | Lunde | G01H 3/00 |
| | | | 367/21 |
| 2014/0043937 A1* | 2/2014 | Teyssandier | G01V 1/3808 |
| | | | 367/23 |
| 2016/0146955 A1 | 5/2016 | Tayart De Borms | |
| 2017/0371055 A1* | 12/2017 | Poole | G01V 1/368 |

FOREIGN PATENT DOCUMENTS

| | | |
|---|---|---|
| GB | 2555909 | 5/2018 |
| WO | 2016062710 | 4/2016 |

* cited by examiner

SWEEP SIGNAL FOR COMBINATION OF A MARINE NON-IMPULSIVE SOURCE OUTPUT WITH A MARINE IMPULSIVE SOURCE OUTPUT

CROSS-REFERENCE TO RELATED APPLICATIONS

This application claims priority to U.S. Provisional Application 62/462,385, filed Feb. 23, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources below the sea surface and over a subterranean formation to be surveyed for mineral deposits. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine survey source.

DETAILED DESCRIPTION

Figure 1:
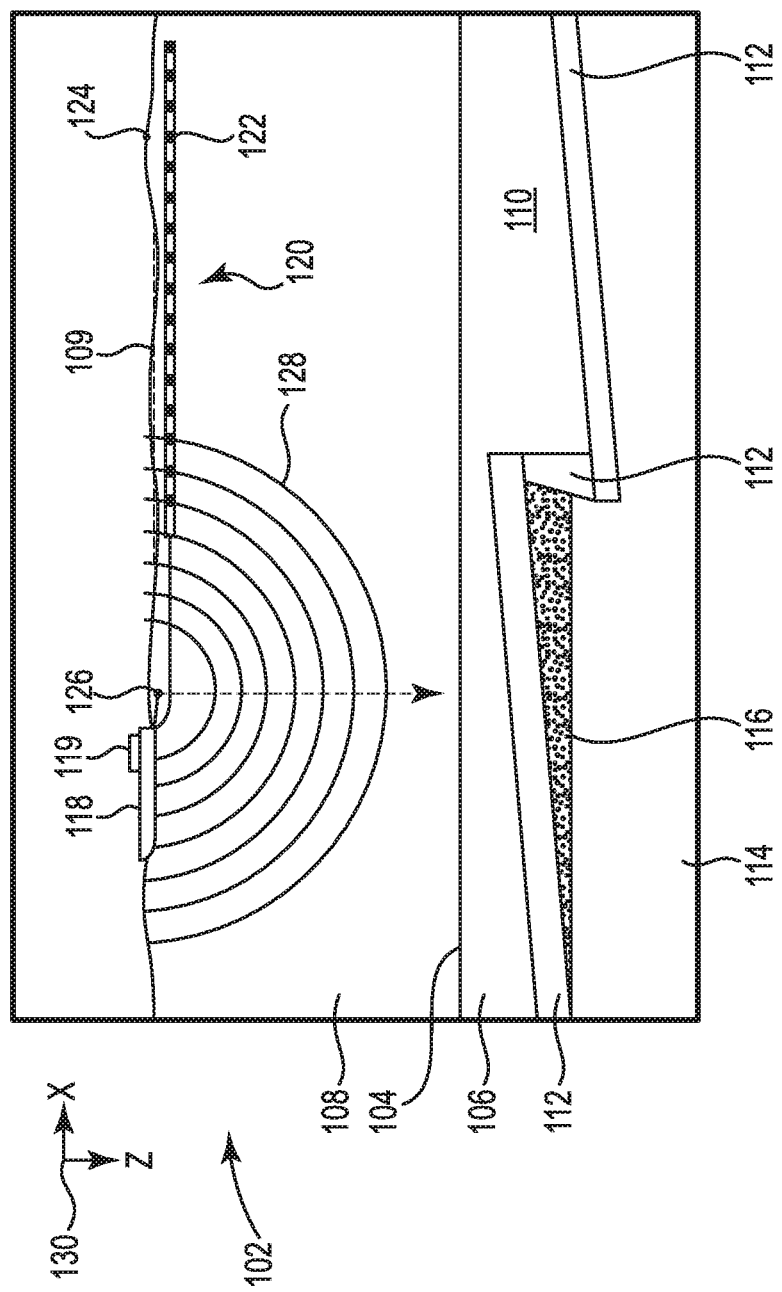
FIG. 1 illustrates an elevation or xz-plane view of marine surveying in which signals are emitted by a marine survey source for recording by marine survey receivers.

The present disclosure is related to optimizing a sweep signal for the combination of a marine non-impulsive source output with a marine impulsive source output. A marine seismic source is a device that generates controlled acoustic energy used to perform marine surveys based on reflection and/or refraction of the acoustic energy. Marine seismic sources can be marine impulsive sources or marine non-impulsive sources. Examples of marine impulsive sources include air guns, water guns, explosive sources (e.g., dynamite), plasma sound sources, boomer sources, etc. An example of a marine non-impulsive source is a marine vibrator. A marine vibrator source can include at least one moving plate. The marine vibrator source can be controlled with a time signal that controls motion of the at least one plate of the marine vibrator source. For example, where the signal produced by the motion of the plate can be described as a sweep (where the frequency changes with time), the time signal can be referred to as a sweep signal. An example of a marine vibrator source is a bender source, which is a flexural disc projector. A bender source may employ one or more piezoelectric elements, such that the mechanical vibration of the bender source is driven by piezoelectric distortion based on electrical energy applied to the piezoelectric element.

Marine impulsive sources are typically not able to generate acoustic energy at low frequencies. As used herein, a "low frequency" includes frequencies from approximately 1 Hertz to approximately 8 Hertz. More particularly, "low frequency" includes frequencies from approximately 1 Hertz to approximately 4 Hertz as impulsive source technology improves in terms of generating acoustic energy at lower frequencies. A marine non-impulsive source can generate acoustic energy over a band of frequencies, including low frequencies. A sweep signal for a marine non-impulsive source can be used to generate energy at low frequencies from the marine non-impulsive source with a desired signal to noise ratio where marine impulsive sources may fail to generate sufficient energy. The marine non-impulsive source may be swept over a range of frequencies. This technique may result in energy spread out with the sweep and less environmental impact than using a marine impulsive source such as air guns or dynamite. However, when a marine impulsive source output is combined with a marine non-impulsive source output, the differences in their signals, such as differences in phase, can result in destructive and constructive interferences. The destructive interferences can be manifested as undesired notches in the amplitude spectrum of the resultant combined output, which can pose a problem for processing acquired data. A notch in an amplitude spectrum is a sharp decrease in the magnitude of the amplitude spectrum over a narrow range of frequencies. A notch may, for example, make de-signature and/or de-ghosting may be particularly difficult.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 332 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a marine survey source 126 for recording by marine survey receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as the marine survey receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 122, comprises an electromagnetic receiver that detects electromagnetic energy within the water. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122. The marine survey vessel 118 can include a controller 119, which is described in more detail with respect to FIG. 6. For example, the controller 119 can be coupled to the marine survey source 126 and configured to control the marine survey source 126 by application of an optimized sweep signal as described herein.

The marine survey vessel 118 can tow one or more marine survey sources 126 that produce signals as the marine survey vessel 118 and streamers 120 move across the sea surface 109. Although not specifically illustrated, the marine survey sources 126 can include at least one marine impulsive source and at least one marine non-impulsive source. Marine survey sources 126 and/or streamers 120 may also be towed by other vessels, or may be otherwise disposed in fluid volume 108. For example, marine survey receivers may be located on ocean bottom cables or nodes fixed at or near the surface 104, and marine survey sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 1 shows acoustic energy illustrated as an expanding, spherical signal, illustrated as semicircles of increasing radius centered at the marine survey source 126, representing a down-going wavefield 128, following a signal emitted by the marine survey source 126. For ease of illustration and consideration with respect to the detail shown in FIG. 1, the down-going wavefield 128 may be considered as a combined output of both a marine impulsive source and a marine non-impulsive source. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
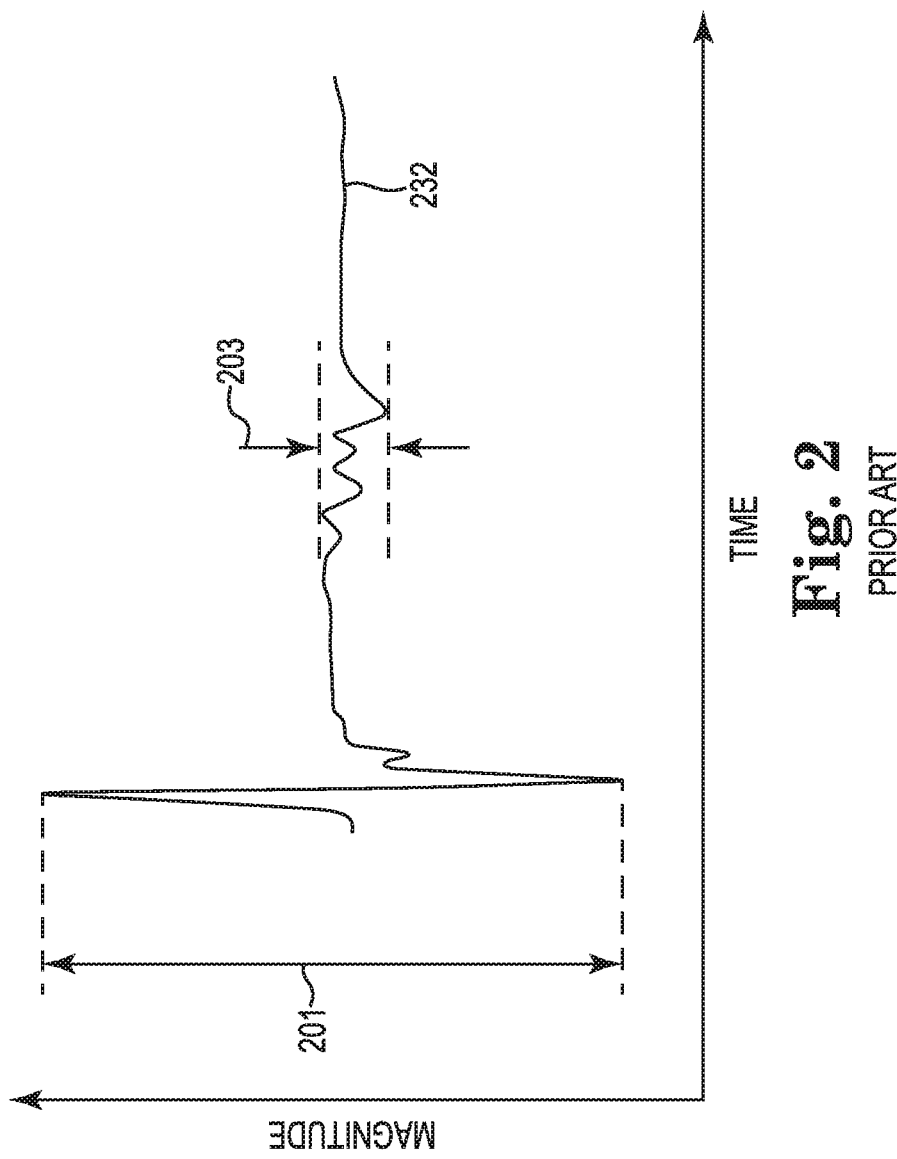
FIG. 2 illustrates a peak to bubble ratio for a marine impulsive source output.

FIG. 2 illustrates a peak to bubble ratio for a marine impulsive source output 232. The graph illustrates the magnitude of the marine impulsive source output 232 on the y-axis versus time on the x-axis. A marine impulsive source output 232, particularly an air gun, can be created by a fast release of a specified volume of high pressure air that produces a steep-fronted shock wave followed by several oscillations resulting from the repeated collapse and expansion of an air bubble, which may be referred to as a bubble pulse. The marine impulsive source output 232 can be a composite signal with a relatively large pulse due to the first collapse called the primary peak 201, which is followed by some oscillations, which are the bubble effect 203 (cycles of expansion and collapse of the bubble).

The ratio of the magnitude of the primary peak 201 to the magnitude of the bubble effect 203 is referred to as the peak to bubble ratio, which is a time domain measure of signal quality. Another time domain measure of signal quality is the peak to peak amplitude (the distance from the peak value on the positive primary peak to the negative peak value of a ghost, which is a reflection of the signal emitted by the marine survey source off of the sea surface). Spectral bandwidth and notch frequency can be used to describe the signature in the frequency domain (not illustrated in FIG. 2). For marine surveys that include only marine impulsive sources, it is generally desirable to have a large value for the magnitude of the primary peak 201, a low value for the magnitude of the bubble effect 203, and thus a large peak to bubble ratio. Some previous approaches to producing a large peak to bubble ratio have included the use of arrays of marine impulsive source elements actuated simultaneously.

At least one embodiment of the present disclosure takes an output 232 of a marine impulsive source as a given and optimizes the output of a marine non-impulsive source as described herein. Combining a relatively low frequency sweep of a marine non-impulsive source with a marine impulsive source output can effectively change a peak to bubble ratio by adding more "background" noise to the combined output.

Figure 3:
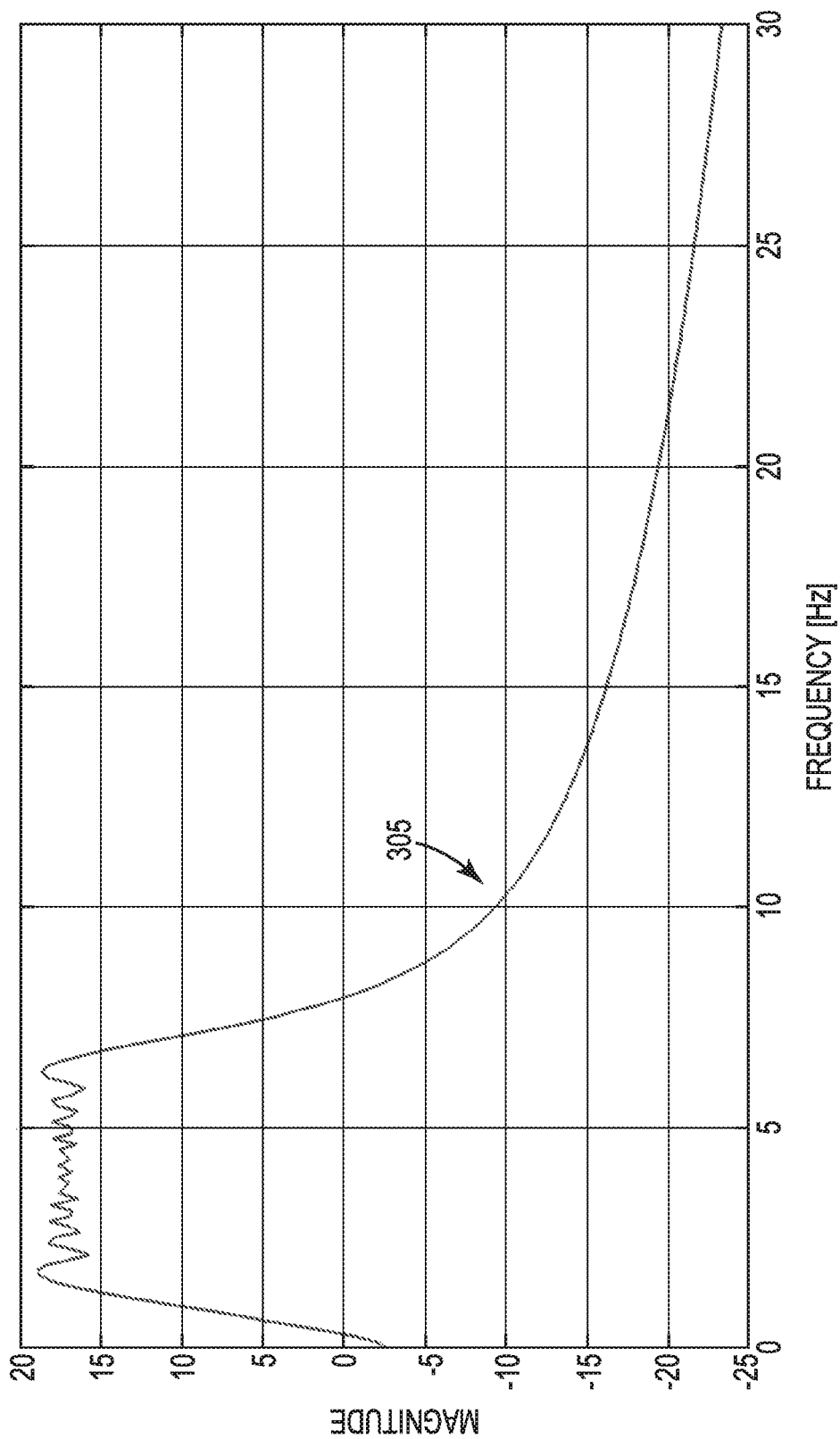
FIG. 3 illustrates an amplitude spectrum corresponding to a marine non-impulsive source output operated according to a linear sweep signal.

FIG. 3 illustrates an amplitude spectrum corresponding to a marine non-impulsive source output operated according to a linear sweep signal 305. An amplitude spectrum is the amplitude distribution as a function of frequency. The graph illustrates the magnitude of the marine non-impulsive source output on the y-axis and frequency on the x-axis. In this example, the sweep runs between about 1 and 7 Hertz. A sweep signal as a waveform can be defined as: $x(t)=\sin(\varphi(t))$, where t is time. The instantaneous frequency is defined to be the phase rate:

$$f(t) = \frac{1}{2\pi} \frac{d\varphi(t)}{dt}$$

and the instantaneous sweep rate is defined to be the frequency rate:

$$c(t) = \frac{1}{2\pi} \frac{d^2\varphi(t)}{dt^2} = \frac{df(t)}{dt}.$$

For a linear sweep signal, the instantaneous frequency varies linearly with time: $f(t)=f_0+kt$ where $f_0$ is the starting frequency at time t=0 and k is denoting the constant sweep rate (rate of frequency change).

$$k = \frac{f_1 - f_0}{T},$$

where $f_1$ is the final frequency and $f_0$ is the starting frequency, and T is the time it takes to sweep from $f_0$ to $f_1$. The corresponding time domain function for the phase of an oscillating signal is the integral of the frequency function, where the phase grows like $\varphi(t+\Delta t) \approx \varphi(t)+2\pi f(t)\Delta t$ such that the derivative of the phase is the angular frequency $\varphi'(t)=2\pi f(t)$. For a linear sweep signal, this results in:

$$\varphi(t) = \varphi_0 + 2\pi \int_0^t f(t)\,dt = \varphi_0 + 2\pi \int_0^t (f_0 + kt)\,dt = \varphi_0 + 2\pi\left(f_0 t + \frac{k}{2}t^2\right),$$

where $\varphi_0$ is the initial phase at time t=0. The initial phase is the angle of the sweep signal at its origin. The corresponding time domain function for a sinusoidal linear sweep signal is the sine of the phase in radians:

$$x(t) = \sin\left[\varphi_0 + 2\pi\left(f_0 t + \frac{k}{2}t^2\right)\right].$$

Figure 4:
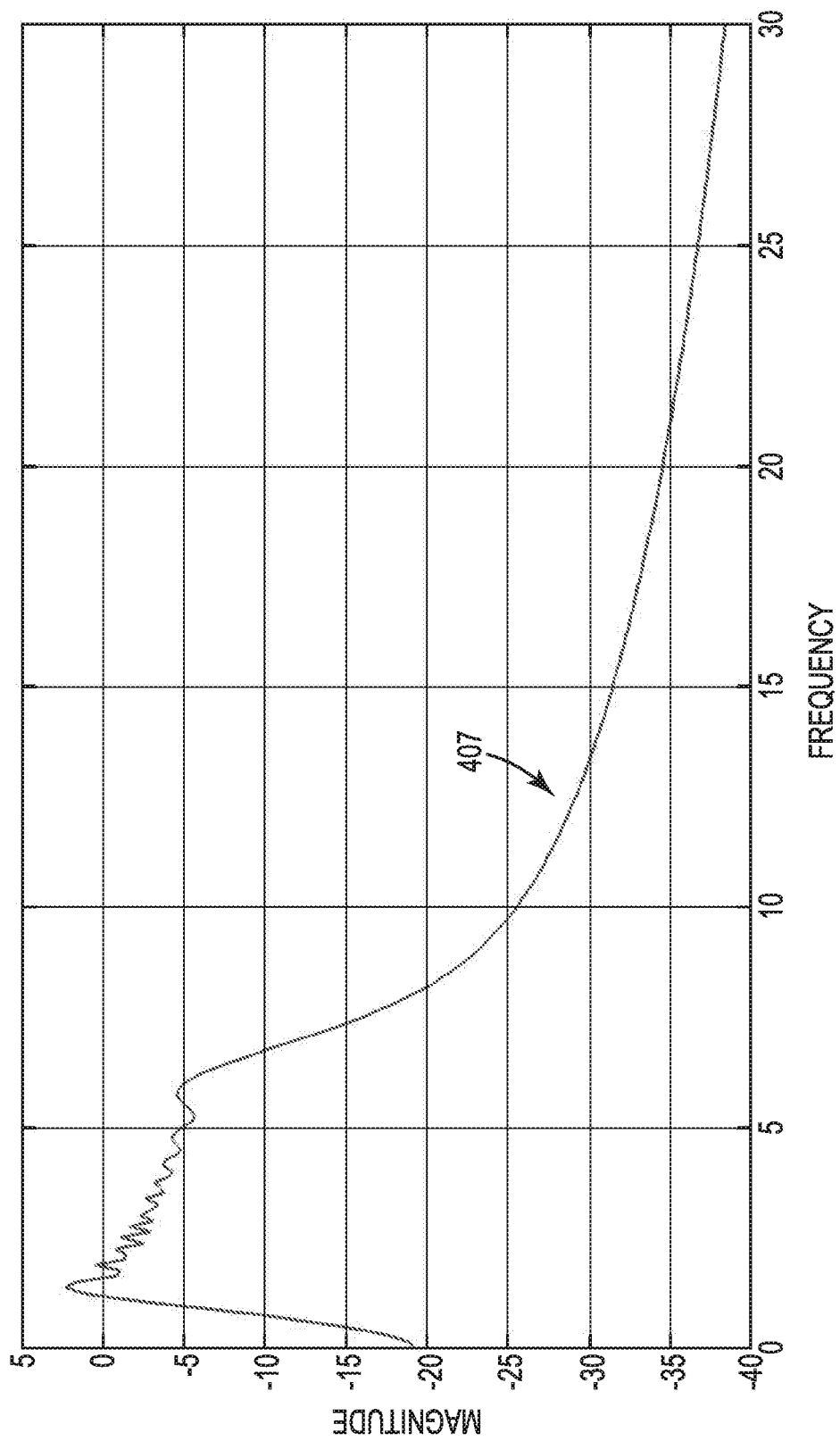
FIG. 4 illustrates an amplitude spectrum corresponding to a marine non-impulsive source output operated according to an exponential sweep signal.

FIG. 4 illustrates an amplitude spectrum corresponding to a marine non-impulsive source output operated according to an exponential sweep signal 407. The graph illustrates the magnitude of the marine non-impulsive source output on the y-axis and frequency on the x-axis. In this example, the sweep runs between about 1 and 7 Hertz. For an exponential sweep signal, the frequency of the sweep signal varies exponentially over time: $f(t)=f_0 k^t$, where k is the rate of exponential change in frequency. The exponential sweep signal has an exponentially changing frequency rate:

$$k = \left(\frac{f_1}{f_0}\right)^{\frac{1}{T}}.$$

The corresponding time domain function for the phase of an exponential sweep signal is the integral of the frequency:

$$\varphi(t) = \varphi_0 + 2\pi \int_0^t f(t)\,dt = \varphi_0 + 2\pi f_0 \int_0^t k^t\,dt = \varphi_0 + 2\pi f_0\left(\frac{k^t - 1}{\ln k}\right).$$

An exponential sweep signal 407, in comparison to a linear sweep signal (such as the linear sweep signal 305 illustrated in FIG. 3), can provide greater magnitude output at low frequency because the sweep rate decays as frequency increases. In contrast, a linear sweep rate does not decay as frequency increases.

Figure 5:
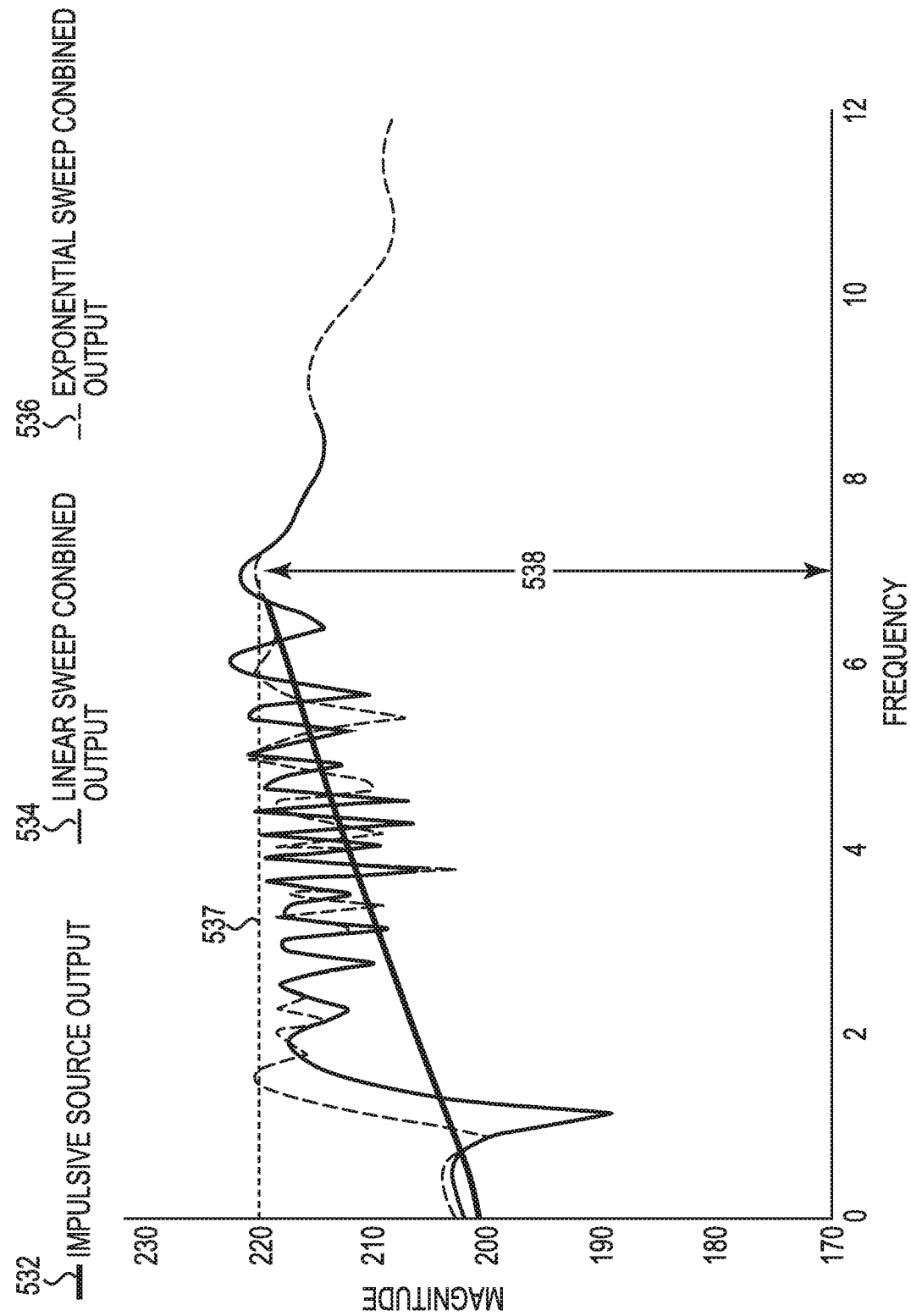
FIG. 5 illustrates various signals associated with a marine impulsive source and marine non-impulsive sources combined with the marine impulsive source.

FIG. 5 illustrates various signals associated with a marine impulsive source and marine non-impulsive sources combined with the marine impulsive source. Specifically, FIG. 5 illustrates various signals representing amplitude spectra corresponding to a marine impulsive source output 532, a first combined output 534 of the marine impulsive source and a marine non-impulsive source operated according to a linear sweep signal, and a second combined output 536 of the marine impulsive source and the marine non-impulsive source operated according to an exponential sweep signal respectively. As used herein, any changes to a sweep signal that controls operation of a marine non-impulsive source may be regarded as causing corresponding changes to the marine non-impulsive source output (either linear or exponential in this example). For example, a change in stop frequency, taper, or initial phase of the sweep signal can cause a corresponding change to the marine non-impulsive source output. The first combined output 534 and the second combined output 536 may be generically referred to as the "combined output 534, 536", which can indicate either or both of the first combined output 534 and the second combined output 536.

The signals are plotted in a graph of magnitude versus frequency, where magnitude is in units of absolute decibels (dB) relative to 1 micropascal (μPa) at 1 meter (m)/Hertz (Hz), and where frequency is in units of Hz. In at least one embodiment, one or more of the signals can be measured, for example, from testing of various marine impulsive and non-impulsive sources. In at least one embodiment, one or more of the signals can be based on models of the various marine impulsive and non-impulsive sources. In at least one embodiment, one or more of the signals can be based on models and testing of the various marine impulsive and non-impulsive sources. The following description with respect to FIG. 5 is generic as to whether the signals are based on testing, models, or both.

The marine impulsive source output 532 may be regarded as being fixed for a given marine impulsive source. In general, in order to achieve a greater magnitude for the marine impulsive source output 532 at lower frequencies, a larger marine impulsive source is required, such as a larger volume air gun. Rather than using a larger marine impulsive source, at least one embodiment of the present disclosure can optimize a sweep signal for a marine non-impulsive source that is to be used in combination with a given marine impulsive source output 532. In at least one embodiment, the optimization can be based on a model of the marine impulsive source output 532 and a model of the marine non-impulsive source output. As illustrated in FIG. 5, neither the first combined output 534 nor the second combined output 536 have been optimized for the marine impulsive source output 532, but may be regarded as being the starting or default combined outputs of the marine non-impulsive source and the marine impulsive source. As illustrated in FIG. 5, the stop frequency 538 of the marine non-impulsive source output is roughly 7 Hz, no taper is defined, and the initial phase is 0 degrees. The stop frequency 538 is the frequency at which the sweep signal ceases its upsweep or downsweep. Again, these may be non-optimized or default values.

Some examples of frequency domain criteria that can measure performance of a marine source include energy within a frequency band, smoothness of the amplitude spectrum, and depth of a notch at particular frequencies. The energy within a frequency band characterizes the power of the marine sources, where greater energy is generally desirable. The smoothness of the amplitude spectrum can be measured using a maximum standard deviation relative to a smooth background function. In general it is desirable to have high energy output that is evenly distributed over a desired frequency range and it is undesirable to have a particular frequency with little or no energy relative to other frequencies. The depth of the notch can be set to a maximum value, where it is generally desirable to have a shallow notch.

Because the marine impulsive source output 532 for a given marine impulsive source is fixed, the low frequency region to be filled by the combined output 534, 536 can be selected. As used herein, "low frequency region" is the range of frequencies below the stop frequency 538 of the marine non-impulsive source. For example, in FIG. 5, the low frequency region ranges below 7 Hz. The low frequency region or the stop frequency 538 can be selected based on the marine impulsive source output in the low frequency region. For example, it may be desirable to increase the energy output in the low frequency region by combined operation of the marine impulsive source with a marine non-impulsive source. The phase and corresponding amplitude spectrum of the marine impulsive source output 532 can be computed. For a given sweep length, the phase of the sweep can be computed. The computed amplitude spectrum of the marine impulsive source output 532 can serve as a baseline for comparison with the combined output 534, 536 after each optimization step. Alternatively, a fixed baseline 537 can serve as a baseline for comparison of the impulsive source output 532 with the combined output 534, 536. For example, a phase difference between the marine impulsive source output 532 and the combined output 534, 536 can be computed for the low frequency region. The phase difference can be reduced or minimized by optimizing over various parameters. For example, the phase difference can be reduced or minimized by computing the least-square error between the amplitude spectrum of the marine impulsive source output 532 and the amplitude spectrum of the combined output 534, 536. The parameters for the optimization can include one or more of selecting a stop frequency 538 of the sweep signal, defining a taper of the sweep signal, adjusting the phase of the sweep signal, changing a type of sweep, such as linear, exponential, or logarithmic, etc., and varying a sweep rate of the sweep signal. In at least one embodiment, the phase optimizations can occur over the initial phase ($\varphi_0$). Optimizations to the sweep rate can be targeted at those frequencies with deep notches after other optimizations have been performed.

Figure 6:
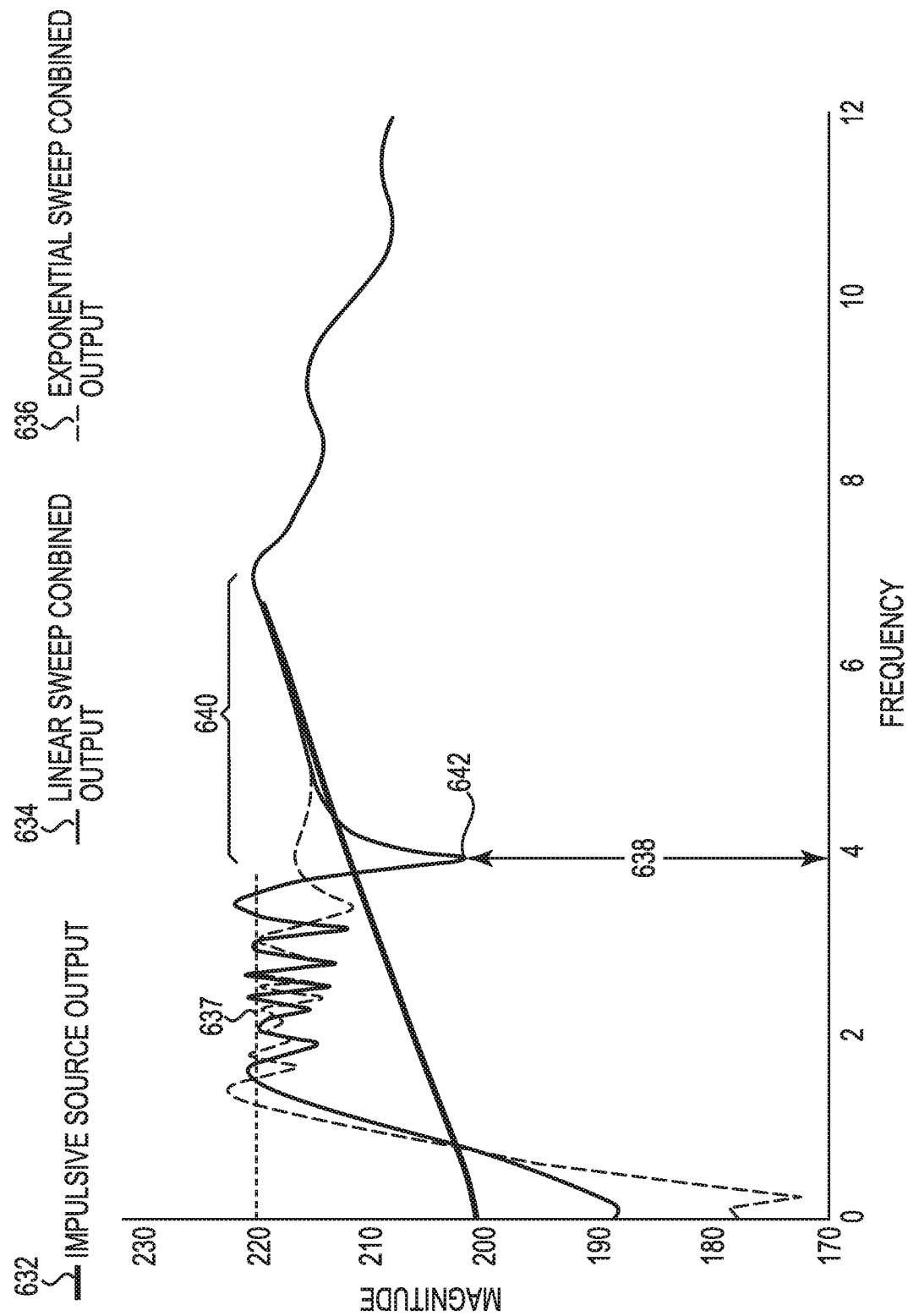
FIG. 6 illustrates various signals associated with a marine impulsive source and marine non-impulsive sources combined with the marine impulsive source.

FIG. 6 illustrates various signals associated with a marine impulsive source and marine non-impulsive sources combined with the marine impulsive source. Specifically, FIG. 6 illustrates various signals representing amplitude spectra corresponding to a marine impulsive source output 632, a first combined output 634 of the marine impulsive source and a marine non-impulsive source operated according to a linear sweep signal, and a second combined output 636 of the marine impulsive source and the marine non-impulsive source operated according to an exponential sweep signal respectively. The marine impulsive source output 632 is the same as the marine impulsive source output 532 illustrated in FIG. 5 because nothing was changed for the marine impulsive source. The magnitude of the combined output 634, 636 is increasing from a very low frequency (much less than 1 Hz) and stays above 200 dB until the stop frequency 638 in FIG. 6. In contrast, in FIG. 5, the magnitudes of the combined output 534, 536 is generally decreasing until a frequency just shy of 2 Hz before they start increasing; and the magnitudes do not reach 200 dB on the rise until approximately 1 Hz for the second combined output 536 and until approximately 2 Hz for the first combined output 534. The fixed baseline 637 is analogous to the fixed baseline 537 illustrated in FIG. 5.

FIG. 6 in comparison to FIG. 5 illustrates some optimization of the sweep signal that controls operation of the marine non-impulsive source. For example, a stop frequency 638 of 4 Hz has been selected for the sweep signal and a taper has been defined for the sweep signal. The stop frequency 638 can be selected such that an amplitude spectrum of the combined output of a marine impulsive source and the marine non-impulsive source is greater than or equal to an amplitude spectrum of the marine impulsive source. Comparing FIG. 6, with a stop frequency of 4 Hz to FIG. 5 with a stop frequency of 7 Hz, it can be seen that other than the very low frequencies (below about 1 Hz) and other than the notch 642, the magnitude of the amplitude spectrum of the first combined output 634 is greater than or equal to the magnitude of the amplitude spectrum of the marine impulsive source output 632. Comparing FIG. 6, with a stop frequency of 4 Hz to FIG. 5 with a stop frequency of 7 Hz, it can be seen that other than the very low frequencies (below about 1 Hz), the magnitude of the amplitude spectrum of the second combined output 636 is greater than or equal to the magnitude of the amplitude spectrum of the marine impulsive source output 632. Higher magnitude outputs are generally desirable because they provide clearer signals for data acquisition.

Further, the sweep signal can be optimized by defining a taper of the sweep signal. The taper can mimic the ramp-up and ramp-down of the marine non-impulsive source to be operated according to the sweep signal. For example, a taper that yields the least energy difference between the amplitude spectrum of the combined output 634, 636 and the amplitude spectrum of the marine impulsive source output 632 can be defined for the sweep signal. Part of the tapered region of the combined output is illustrated generally at 640. Tapering of the sweep signal can be desirable particularly where the marine non-impulsive source is a mechanical system with moving parts such that abrupt stopping would increase the destructive interference from the marine non-impulsive source output. For the same reason, in addition to tapering in association with the stop frequency, a gradual increase of the sweep signal can be selected such that the sweep signal includes a lesser amplitude near a start frequency of the sweep signal relative to the amplitude of the sweep signal at operational frequencies. Operational frequencies are frequencies at which the non-impulsive source is operational.

The taper of the sweep signal can be defined such that the sweep signal includes a lesser amplitude after the stop frequency 638 relative to an amplitude of the sweep signal at operational frequencies. The taper can be defined by a window function. A window function, which may also be referred to as a tapering function, is a mathematical function used in signal processing that is zero-valued outside of some chosen interval. When another function, waveform, or data sequence is multiplied by a window function, the product is also zero-valued outside the interval. The remaining, overlapping, portion is referred to as the window. Examples of suitable window functions include a Tukey window function, a Hanning window function, and a Hamming window function. An example of a Tukey window function in MATLAB is a tukeywin function, which takes the form w=tukeywin (L,r) and returns an L-point Tukey window in the column vector w. A Tukey window is a rectangular window in the first and last r/2 percent of the samples equal to parts of the cosine, where r is a real number between 0 and 1. For example, the taper can be defined as tukeywin (L, 0.05). The taper is zero phased. The specific phase information cannot be seen in the amplitude spectra of FIG. 5 and FIG. 6.

Figure 7:
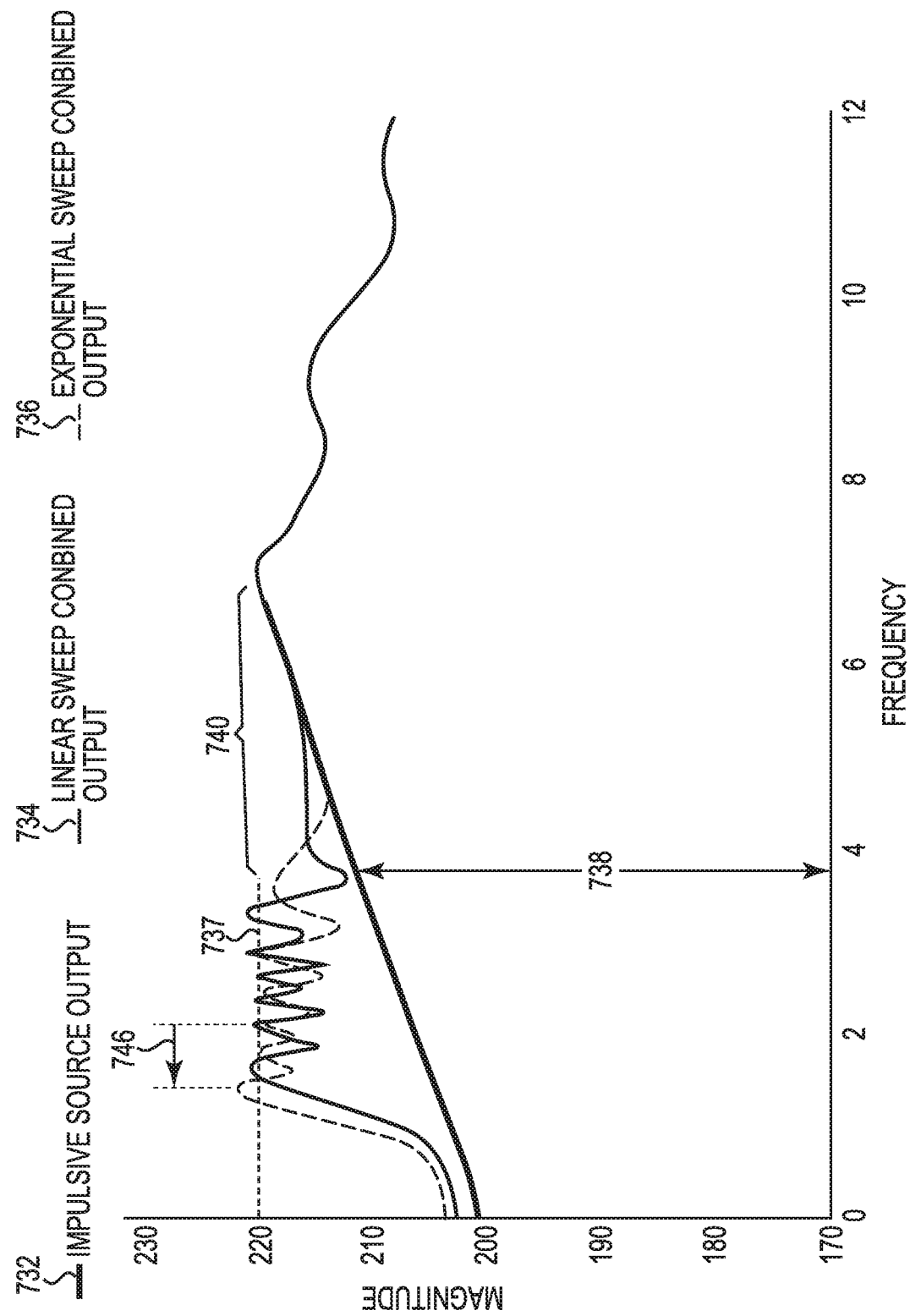
FIG. 7 illustrates various signals associated with a marine impulsive source and marine non-impulsive sources combined with the marine impulsive source.

The mean magnitudes of the combined output 634, 636 is greater at operational frequencies in FIG. 6 than in FIG. 5. The combined output 634, 636 is much smoother spectra in FIG. 6 than in FIG. 5, which promotes higher quality data having less interference. Further optimization can be performed by adjusting an initial phase of the sweep signal. For example, the initial phase of the sweep signal can be adjusted such that a magnitude of the combined output 634, 636 is closer in magnitude to a magnitude of the marine impulsive source output 632 after the stop frequency. Furthermore, the initial phase of the sweep signal can be adjusted such that the magnitude of the combined output 634, 636 is greater than or equal to the magnitude of the marine impulsive source output 632 after the stop frequency, which is illustrated in FIG. 7. Generally, the destructive interference in the combined output 634, 636 is caused by the marine impulsive source output 632 being out of phase with the marine non-impulsive source output. This optimization with respect to this parameter is aimed at reducing the phase difference by adjusting the initial phase.

FIG. 7 illustrates various signals associated with a marine impulsive source and marine non-impulsive sources combined with the marine impulsive source. Specifically, FIG. 7 illustrates various signals representing amplitude spectra corresponding to a marine impulsive source output 732, a first combined output 734 of the marine impulsive source and a marine non-impulsive source operated according to a linear sweep signal, and a second combined output 736 of the marine impulsive source and the marine non-impulsive source operated according to an exponential sweep signal respectively. The fixed baseline 737 is analogous to the fixed baseline 537 illustrated in FIG. 5. The stop frequency 738 is the same as in FIG. 6 (4 Hz). The taper of the sweep signal is defined the same as in FIG. 6 (tukeywin (L, 0.05)). Part of the tapered region of the combined output 734, 736 is illustrated generally at 740. However, in order to further optimize the sweep signal that controls operation of the marine non-impulsive source, a phase has been adjusted as indicated by reference numeral 746. For example the phase has been adjusted by 65 degrees by adjusting the initial phase of the sweep signal.

The adjustment of the initial phase can be such that the combined output 734, 736 is closer to being in phase with (or is in phase with) the phase of the marine impulsive source output 732. Oscillations in the combined output 734, 736 are not desired, but a smooth, flat combined output 734, 736 is desired. If, for example, the combined output 734, 736 was 180 degrees out of phase with the marine impulsive source output 732, the combined output 734, 736 would be effectively zero. If the combined output 734, 736 was exactly in phase with (or 0 degrees out of phase with) the marine impulsive source output 732, the combined output 734, 736 would not have any destructive interference. The phase of the marine impulsive source output 732 can be a known quantity. At least one embodiment of the present disclosure can include optimizing a sweep signal by adjusting an initial phase of the sweep signal to cause the combined output 734, 736 to be more in line with the phase of the marine impulsive source output 732. After the initial phase is adjusted, the remaining notches in the amplitude spectrum of the combined output 734, 736 represent those frequencies where there are still significant phase differences. The marine non-impulsive source output at those frequencies can be increased to help account for the notches, for example, by increasing the combined output at the notch frequencies. This can be achieved by varying the sweep rate at these frequencies such that more energy is generated by spending more time at the notch frequencies. In at least one embodiment, the depths of the notches can be reduced by producing less energy at these frequencies. For example, the marine non-impulsive source output can be reduced at those frequencies by varying the sweep rate such that less time is spent operating at those frequencies.

As illustrated by comparing FIG. 7 to FIG. 6, adjusting the initial phase can result in the combined output 734, 736 starting at a magnitude greater than a magnitude of the marine impulsive source output 732 and staying at a greater magnitude during operation until the stop frequency 738. After the stop frequency 738, the sweep signal is tapered 740 such that the combined output 734, 736 is generally in line with the rising magnitude of the marine impulsive source output 732.

The sweep signal can be optimized over an initial phase of the sweep by a least-square error minimization such that a magnitude of the energy of the combined output 734, 736 is greater than a magnitude of the energy of the impulsive source output 732 at operational frequencies. The combined output 734, 736 can have sufficient spectral smoothness at operational frequencies such that notches, if any, are sufficiently small that they do not drop below the impulsive source output 732. If the sweep length is fixed and the low frequency region of the combined output 734, 736 does not have sufficient magnitude, the type of sweep can be changed as described herein. For example, the type of sweep can be changed from any of linear, exponential, or logarithmic to any other of linear, exponential, or logarithmic. After other parameters of the optimization have been determined, if some notches are still present in the combined output 734, 736, the sweep rate of the sweep signal can be varied to fill in the notches in the combined output 734, 736. For example, a variable sweep rate can be used for the sweep signal. A sweep rate refers to how quickly a frequency of a signal increases or decreases with time.

Figure 8:
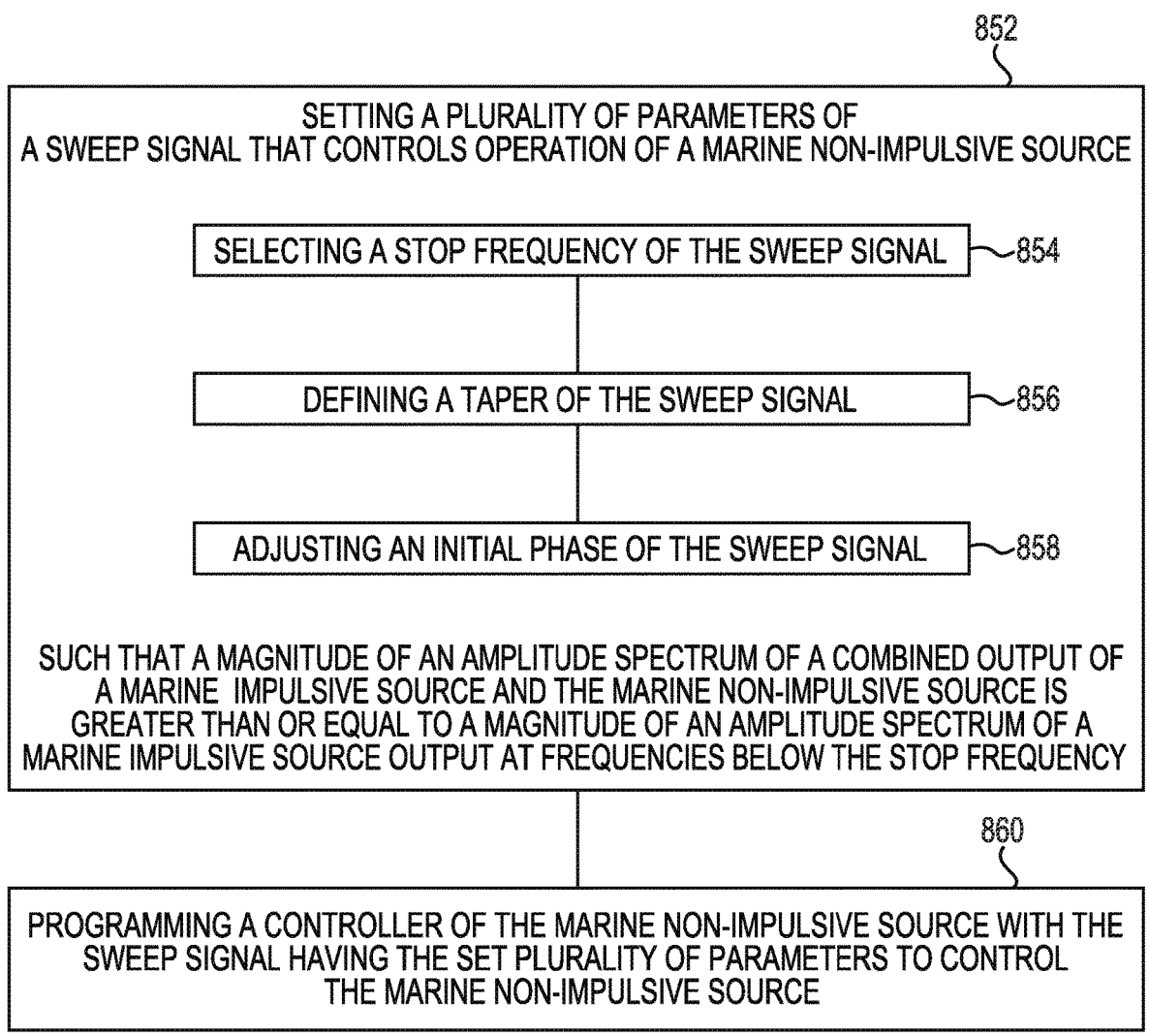
FIG. 8 illustrates an exemplary embodiment of a method flow diagram for optimizing a sweep signal for combination of a marine non-impulsive source output with a marine impulsive source output.

FIG. 8 illustrates a method flow diagram for optimizing a sweep signal for combination of a marine non-impulsive source output with a marine impulsive source output. At block 852, the method can include setting a plurality of parameters of a sweep signal that controls operation of a marine non-impulsive source. Setting parameters can include selecting a stop frequency of the sweep signal at block 854, defining a taper of the sweep signal at block 856, and adjusting an initial phase of the sweep signal at block 858. The parameters can be set such that a magnitude of an amplitude spectrum of a combined output of a marine impulsive source and the marine non-impulsive source is greater than a magnitude of an amplitude spectrum of a marine impulsive source output at frequencies below the stop frequency. For example, the parameters can be set such that the amplitude spectrum of the combined output is fit to a fixed baseline according to minimum least squares error between the amplitude spectrum of the combined output and the fixed baseline, such as the baseline 737 illustrated in FIG. 7.

Setting the plurality of parameters can further include changing a type of the sweep signal from linear to exponential in response to any notch in the amplitude spectrum of the combined output being less than a magnitude of the amplitude spectrum of the marine impulsive source output within a predefined frequency range after selecting a stop frequency, defining the taper, and adjusting the initial phase of the sweep signal. Setting the plurality of parameters can further include varying a sweep rate of the sweep signal in response to any notch in the amplitude spectrum of the combined output being less than a magnitude of the amplitude spectrum of the marine impulsive source output within a predefined frequency range after selecting the stop frequency, defining the taper, and adjusting the initial phase of the sweep signal. For example, the predefined frequency range can be an operational frequency range (between start and stop frequencies) of the marine non-impulsive source. In at least one embodiment, the predefined frequency range can be a user-configurable option regardless of whether it is the same as the operational frequency range of the marine non-impulsive source.

In at least one embodiment, the method can further include modeling the marine impulsive source output over a range of frequencies and modeling the marine non-impulsive source output over the range of frequencies. The method can include computing the phase difference and reducing the phase difference based on the modelling.

At block 860, the method can include programming a controller of a marine non-impulsive source with the sweep signal having the plurality of parameters set to control the marine non-impulsive source. Programming the controller can include storing executable instructions in the controller to control operation of the controller. The controller can be analogous to the controller 119 illustrated in FIG. 1. The controller can be programmed onshore or offshore. In at least one embodiment, the method can include modeling the marine impulsive source output over a range of frequencies and modeling a marine non-impulsive source output over the range of frequencies.

Figure 9:
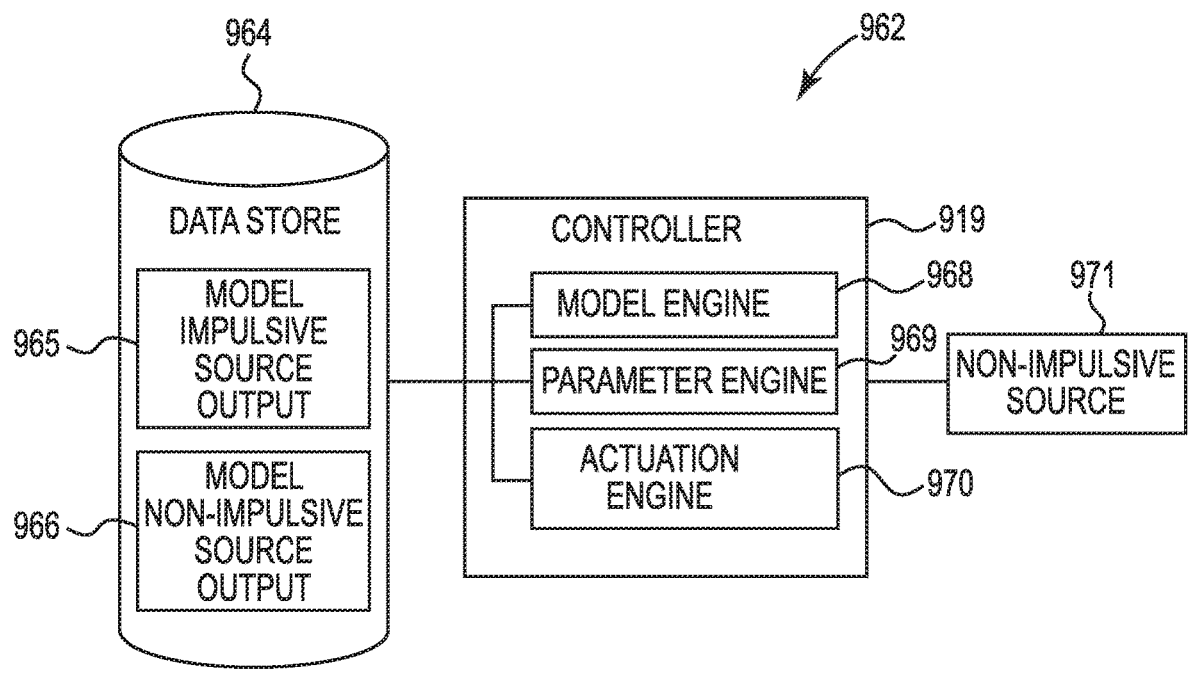
FIG. 9 illustrates a diagram of an exemplary embodiment of a system for optimizing a sweep signal for combination of a marine non-impulsive source output with a marine impulsive source output.

FIG. 9 illustrates a diagram of a system 962 for optimizing a sweep signal for combination of a marine non-impulsive source output with a marine impulsive source output. The system 962 can include a data store 964, a controller 919 coupled to the data store 964, and a marine non-impulsive source 971 coupled to the controller 919. Although not specifically illustrated, the system 962 can include a marine impulsive source coupled to the controller 919. The controller 919 can be analogous to the controller 119 illustrated in FIG. 1. The data store 964 can store a model of a marine impulsive source output 965 and a model of a marine non-impulsive source output 966. The model of the marine impulsive source output 965 can be based on physical characteristics of the marine impulsive source, such as air gun volume. The model of the marine non-impulsive source output 966 can be based on physical characteristics of the marine non-impulsive source, such as bender plate size, and a sweep signal used to control the marine non-impulsive source.

The controller 919 can include a number of engines (e.g., a model engine 968, a parameter engine 969, and/or an actuation engine 970) and can be in communication with the data store 964 via a communication link. The system 962 can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller 919 can be configured, for example, via a combination of hardware and program instructions in the model engine 968, parameter engine 969, and/or actuation engine 970, to optimize a sweep signal for combination of a marine non-impulsive source output with a marine impulsive source output and actuate the marine non-impulsive source by application of the sweep signal to the marine non-impulsive source. The model engine 968 can be configured to model a combined output of the marine non-impulsive source 971 and a marine impulsive source based on the models of outputs of the marine non-impulsive source 971 and the marine impulsive source. The parameter engine 969 can be configured to set a plurality of parameters of a sweep signal that controls operation of the marine non-impulsive source such that a magnitude of the amplitude spectrum of the combined output is greater than or equal to the model of the marine impulsive source output. The plurality of parameters can include, at least, a stop frequency of a sweep signal, a taper of the sweep signal, and an initial phase of the sweep signal. In at least one embodiment, the plurality of parameters further include a type of the sweep signal and/or a sweep rate of the sweep signal. The parameters can be set by the parameter engine 969 by storing values of the parameters and operating the marine non-impulsive source 971 according to the stored parameters.

The actuation engine 970 can be configured to actuate the marine non-impulsive source 971 by application of the sweep signal thereto. In at least one embodiment, the actuation engine 970 can be configured to actuate the marine non-impulsive source 971 simultaneously with actuation of the marine impulsive source.

In at least one embodiment, the controller 919 can be configured to update the model of the marine impulsive source output 965 due to changes to the physical characteristics of the marine impulsive source during operation thereof. For example, the volume of an air gun can change during operation due to heating or cooling. The controller 919 can be configured to re-model the combined output according to the update and to re-set the plurality of parameters based on the update.

Figure 10:
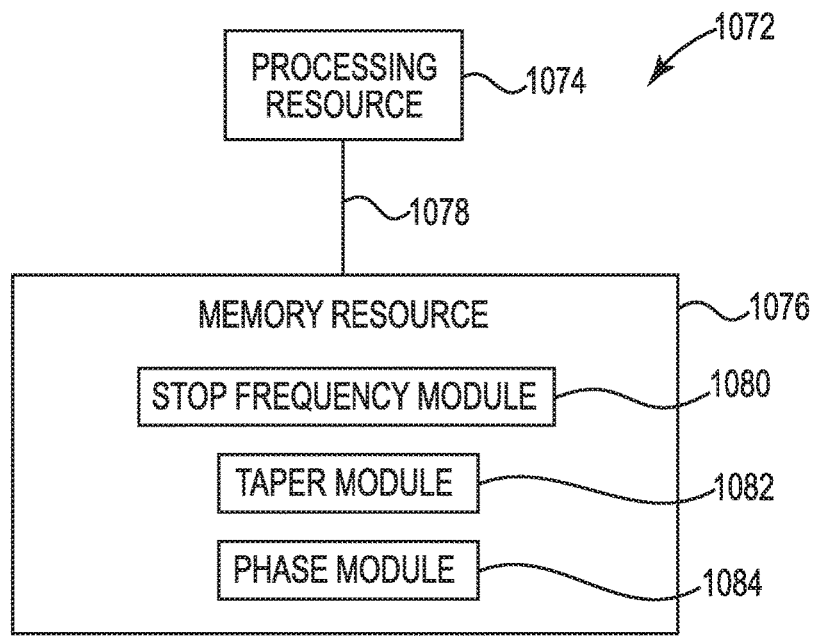
FIG. 10 illustrates a diagram of a machine for optimizing a sweep signal for combination of a marine non-impulsive source output with a marine impulsive source output.

FIG. 10 illustrates a diagram of a machine 1072 for optimizing a sweep signal for combination of a marine non-impulsive source output with a marine impulsive source output. In at least one embodiment, the machine 1072 can be analogous to the system 962 illustrated in FIG. 9. The machine 1072 can utilize software, hardware, firmware, and/or logic to perform a number of functions. The machine 1072 can be a combination of hardware and program instructions configured to perform a number of functions (e.g., actions). The hardware, for example, can include a number of processing resources 1074 and a number of memory resources 1076, such as a machine-readable medium or other non-transitory memory resources 1076. The memory resources 1076 can be internal and/or external to the machine 1072, for example, the machine 1072 can include internal memory resources and have access to external memory resources. The program instructions, such as machine-readable instructions, can include instructions stored on the machine-readable medium to implement a particular function. The set of machine-readable instructions can be executable by one or more of the processing resources 1074. The memory resources 1076 can be coupled to the machine 1072 in a wired and/or wireless manner. For example, the memory resources 1076 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1076 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 1074 can be coupled to the memory resources 1076 via a communication path 1078. The communication path 1078 can be local or remote to the machine 1072. Examples of a local communication path 1078 can include an electronic bus internal to a machine, where the memory resources 1076 are in communication with the processing resources 1074 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1078 can be such that the memory resources 1076 are remote from the processing resources 1074, such as in a network connection between the memory resources 1076 and the processing resources 1074. That is, the communication path 1078 can be a network connection. Examples of such a network connection can include a local area network, wide area network, personal area network, and the Internet, among others.

Although not specifically illustrated in FIG. 10, the memory resources 1076 can store a model of the marine impulsive source output and a model of the marine non-impulsive source output. As is shown in FIG. 10, the machine-readable instructions stored in the memory resources 1076 can be segmented into a number of modules 1080, 1082, and 1084 that when executed by the processing resources 1074 can perform a number of functions. As used herein a module includes a set of instructions included to perform a particular task or action. The number of modules 1080, 1082, and 1084 can be sub-modules of other modules. For example, the taper module 1082 can be a sub-module of the stop frequency module 1080 and/or the taper module 1082 and the stop frequency module 1080 can be contained within a single module. Furthermore, the number of modules 1080, 1082, and 1084 can comprise individual modules separate and distinct from one another. Examples are not limited to the specific modules 1080, 1082, and 1084 illustrated in FIG. 10.

The stop frequency module 1080 can include program instructions and/or a combination of hardware and program instructions that, when executed by a processing resource 1074, can select a stop frequency of a sweep signal that controls operation of a marine non-impulsive source. The instructions to select the stop frequency can be executed to store the stop frequency and operate the marine non-impulsive source with the sweep signal that stops at the stop frequency.

The taper module 1082 can include program instructions and/or a combination of hardware and program instructions that, when executed by a processing resource 1074, can define a taper of the sweep signal that provides a least energy difference between the amplitude spectrum of the marine impulsive source and the amplitude spectrum of the combined output.

The phase module 1084 can include program instructions and/or a combination of hardware and program instructions that, when executed by a processing resource 1074, can adjust an initial phase of the sweep signal. For example, the initial phase can be adjusted such that any notch in the amplitude spectrum of the combined output is greater in magnitude than the amplitude spectrum of the marine impulsive source output at a frequency of the notch.

Collectively, the program instructions and/or a combination of hardware and program instructions, when executed by a processing resource 1074, can select the stop frequency, define the taper, and adjust the initial phase of the sweep signal such that a magnitude of an amplitude spectrum of a combined output of a marine impulsive source and the marine non-impulsive source is greater than or equal to a magnitude of an amplitude spectrum of the marine impulsive source.

The instructions to select the stop frequency, define the taper, and adjust the initial phase can comprise instructions to select the stop frequency, define the taper, and adjust the initial phase recursively to optimize the sweep signal. Although not specifically illustrated, the memory resources 1076 can store instructions executable by the processing resources 1074 to change a type of the sweep signal in response to any notch in the amplitude spectrum of the combined output being less than a magnitude of the amplitude spectrum of the marine impulsive source output within a predefined frequency range. Although not specifically illustrated, the memory resources 1076 can store instructions executable by the processing resources 1074 to vary a sweep rate of the sweep signal at a frequency where the magnitude of the amplitude spectrum of the combined output is less than a magnitude of the amplitude spectrum of the impulsive source output.

In accordance with a number of embodiments of the present disclosure, a geophysical data product may be produced. A plurality of parameters of a sweep signal that controls operation of a marine non-impulsive source can be set. Setting the plurality of parameters can include selecting a stop frequency of the sweep signal, defining a taper of the sweep signal, and adjusting an initial phase of the sweep signal such that a magnitude of an amplitude spectrum of a combined output of a marine impulsive source and the marine non-impulsive source is greater than or equal to a magnitude of an amplitude spectrum of a marine impulsive source output at frequencies below the stop frequency. Geophysical data may be obtained from operation of the marine impulsive source and from operation of the marine non-impulsive source with the sweep signal having the plurality of parameters set. The geophysical data can be recorded on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. Processing the geophysical data can include performing a full waveform inversion to determine a physical property of a subsurface location. The geophysical data product can be recorded on a non-transitory machine-readable medium. In some instances, once onshore in the United States, geophysical analysis may be performed on the geophysical data product. In some instances, geophysical analysis may be performed on the geophysical data product offshore. For example, geophysical data can be obtained.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    setting a plurality of parameters of a sweep signal that controls operation of a marine non-impulsive source, wherein setting the plurality of parameters includes at least:
        selecting a stop frequency of the sweep signal,
        defining a taper of the sweep signal, and
        adjusting an initial phase of the sweep signal,
    such that a magnitude of an amplitude spectrum of a combined output of a marine impulsive source and the marine non-impulsive source is greater than or equal to a magnitude of an amplitude spectrum of a marine impulsive source output at frequencies below the stop frequency; and
        programming a controller of the marine non-impulsive source with the sweep signal having the plurality of parameters set to control the marine non-impulsive source.

2. The method of claim 1, wherein setting the plurality of parameters comprises setting the plurality of parameters such that the amplitude spectrum of the combined output is fit to a fixed baseline according to minimum least squares error between the amplitude spectrum of the combined output and the fixed baseline.

3. The method of claim 1, wherein adjusting the initial phase comprises adjusting the initial phase such that any notch in the amplitude spectrum of the combined output is greater in magnitude than the amplitude spectrum of the marine impulsive source output.

4. The method of claim 1, wherein setting the plurality of parameters further includes changing a type of the sweep signal from linear to exponential in response to any notch in the amplitude spectrum of the combined output being less than a magnitude of the amplitude spectrum of the marine impulsive source output within a predefined frequency range after selecting the stop frequency, defining the taper, and adjusting the initial phase of the sweep signal.

5. The method of claim 1, wherein setting the plurality of parameters further includes varying a sweep rate of the sweep signal in response to any notch in the amplitude spectrum of the combined output being less than a magnitude of the amplitude spectrum of the marine impulsive source output within a predefined frequency range after selecting the stop frequency, defining the taper, and adjusting the initial phase of the sweep signal.

6. The method of claim 1, further comprising:
    modeling the marine impulsive source output over a range of frequencies; and
    modeling the marine non-impulsive source output over the range of frequencies.

7. The method of claim 6, further comprising computing a phase difference between the marine impulsive source output and the combined output and reducing the phase difference based on the modelling.

8. A system, comprising:
    a marine non-impulsive source; and
    a controller comprising hardware coupled to the marine non-impulsive source, wherein the controller is configured to:
        model a combined output of the marine non-impulsive source and a marine impulsive source based on models of outputs of the marine non-impulsive source and the marine impulsive source;

set a plurality of parameters of a sweep signal that controls operation of the marine non-impulsive source such that a magnitude of an amplitude spectrum of the model of the combined output is greater than or equal to a magnitude of the model of the marine impulsive source output, wherein the plurality of parameters include at least a stop frequency of the sweep signal, a taper of the sweep signal, and an initial phase of the sweep signal; and actuate the marine non-impulsive source by application of the sweep signal to the marine non-impulsive source.

9. The system of claim 8, wherein the controller is configured to actuate the marine non-impulsive source simultaneously with actuation of the marine impulsive source.

10. The system of claim 8, wherein the model of the marine impulsive source output is based on physical characteristics of the marine impulsive source; and wherein the model of the marine non-impulsive source output is based on physical characteristics of the marine non-impulsive source and the sweep signal.

11. The system of claim 10, wherein the controller is further configured to:

update the model of the marine impulsive source output due to changes to the physical characteristics of the marine impulsive source during operation of the marine impulsive source;

re-model the combined output according to the update; and re-set the plurality of parameters.

12. The system of claim 8, wherein the plurality of parameters further include a type of the sweep signal.

13. The system of claim 8, wherein the plurality of parameters further include a sweep rate of the sweep signal.

14. The system of claim 8, wherein the hardware comprises an application specific integrated circuit.

15. The system of claim 8, wherein the hardware comprises a processing resource coupled to a memory resource that stores instructions executable by the processing resource.

16. A non-transitory machine-readable medium storing instructions executable by a processing resource to:

select a stop frequency of a sweep signal that controls operation of a marine non-impulsive source;

define a taper of the sweep signal;

adjust an initial phase of the sweep signal such that a magnitude of an amplitude spectrum of a combined output of a marine impulsive source and the marine non-impulsive source is greater than or equal to a magnitude of an amplitude spectrum of the marine impulsive source output at frequencies below the stop frequency; and actuate the marine non-impulsive source by application of the sweep signal to the marine non-impulsive source.

17. The medium of claim 16, further including instructions to change a type of the sweep signal in response to any notch in the amplitude spectrum of the combined output being less than a magnitude of the amplitude spectrum of the marine impulsive source output within a predefined frequency range.

18. The medium of claim 16, wherein the instructions to select the stop frequency, define the taper, and adjust the initial phase comprise instructions to select the stop frequency, define the taper, and adjust the initial phase recursively to optimize the sweep signal.

19. The medium of claim 16, further including instructions to vary a sweep rate of the sweep signal at a frequency where the magnitude of the amplitude spectrum of the combined output is less than the magnitude of the amplitude spectrum of the marine impulsive source output.

20. A method of manufacturing a geophysical data product, the method comprising:

setting a plurality of parameters of a sweep signal that controls operation of a marine non-impulsive source, wherein setting the plurality of parameters includes:

selecting a stop frequency of the sweep signal;

defining a taper of the sweep signal; and adjusting an initial phase of the sweep signal;

such that a magnitude of an amplitude spectrum of a combined output of a marine impulsive source and the marine non-impulsive source is greater than or equal to a magnitude of an amplitude spectrum of a marine impulsive source output at frequencies below the stop frequency;

obtaining geophysical data from operation of the marine impulsive source and from operation of the marine non-impulsive source with the sweep signal having the changed plurality of parameters; and recording the geophysical data on a non-transitory machine-readable medium.

* * * * *